W. T. BLAKE.
DRIVE MECHANISM FOR MOWING MACHINES.
APPLICATION FILED JUNE 12, 1920.

1,410,362.

Patented Mar. 21, 1922.
2 SHEETS—SHEET 1.

W. T. Blake.
INVENTOR

BY Victor J. Evans
ATTORNEY

WITNESS:

W. T. BLAKE.
DRIVE MECHANISM FOR MOWING MACHINES.
APPLICATION FILED JUNE 12, 1920.
1,410,362.
Patented Mar. 21, 1922.
2 SHEETS—SHEET 2.
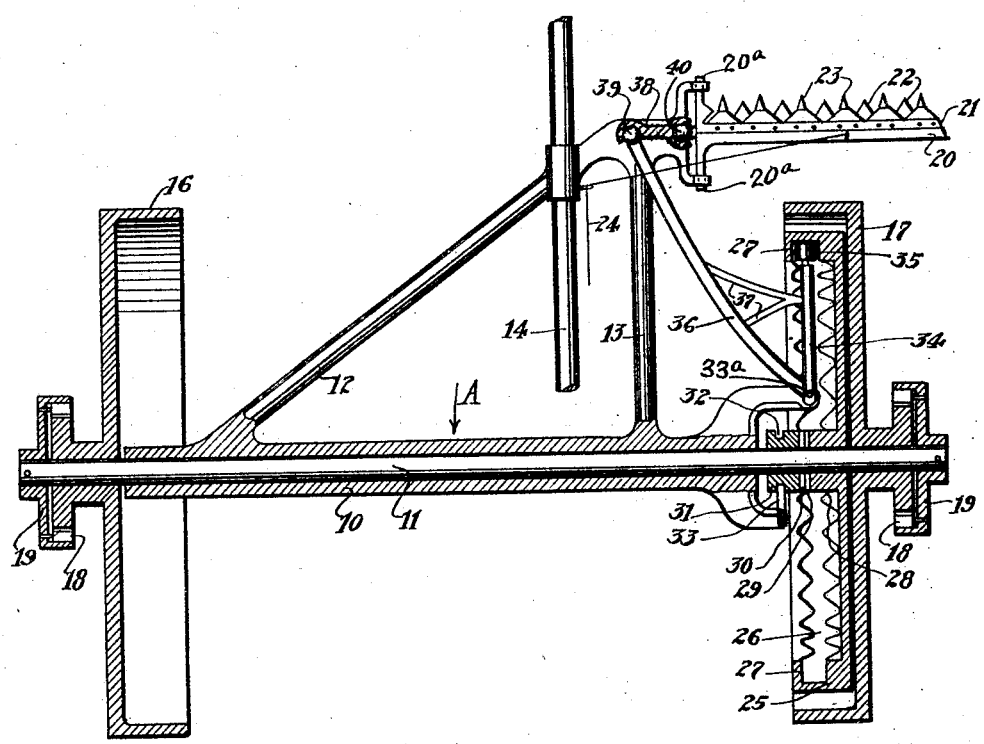
Fig. 2.
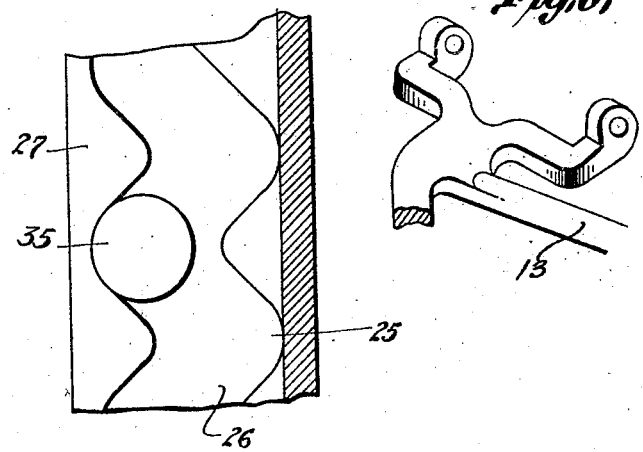
Fig. 4.
Fig. 5.
W. T. Blake.
INVENTOR
BY Victor J. Evans
ATTORNEY
WITNESS:

UNITED STATES PATENT OFFICE.

WILLIAM T. BLAKE, OF RENO, OHIO.

DRIVE MECHANISM FOR MOWING MACHINES.

1,410,362.  Specification of Letters Patent.  Patented Mar. 21, 1922.

Application filed June 12, 1920. Serial No. 388,592.

*To all whom it may concern:*

Be it known that I, WILLIAM T. BLAKE, a citizen of the United States, residing at Reno, in the county of Washington and State of Ohio, have invented new and useful Improvements in Drive Mechanism for Mowing Machines, of which the following is a specification.

This invention relates to harvesting machines, particularly to mowers for grass and grain, and has for its object the provision of a novel drive mechanism for imparting reciprocatory movement to the sickle bar without the use of the multiplicity of gears commonly used for accomplishing the movement.

An important object is the provision of a device of this character in which the driving of the sickle bar is effected by the action of a cam carried by the drive axle of the device and protected by the rim of one of the wheels.

An additional object is the provision of a device of this character which will be comparatively simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings in which—

Figure 2 is a horizontal sectional view,

Figure 4 is a detail view of the operating cam, and

Figure 5 is a detail view.

Figure 1:
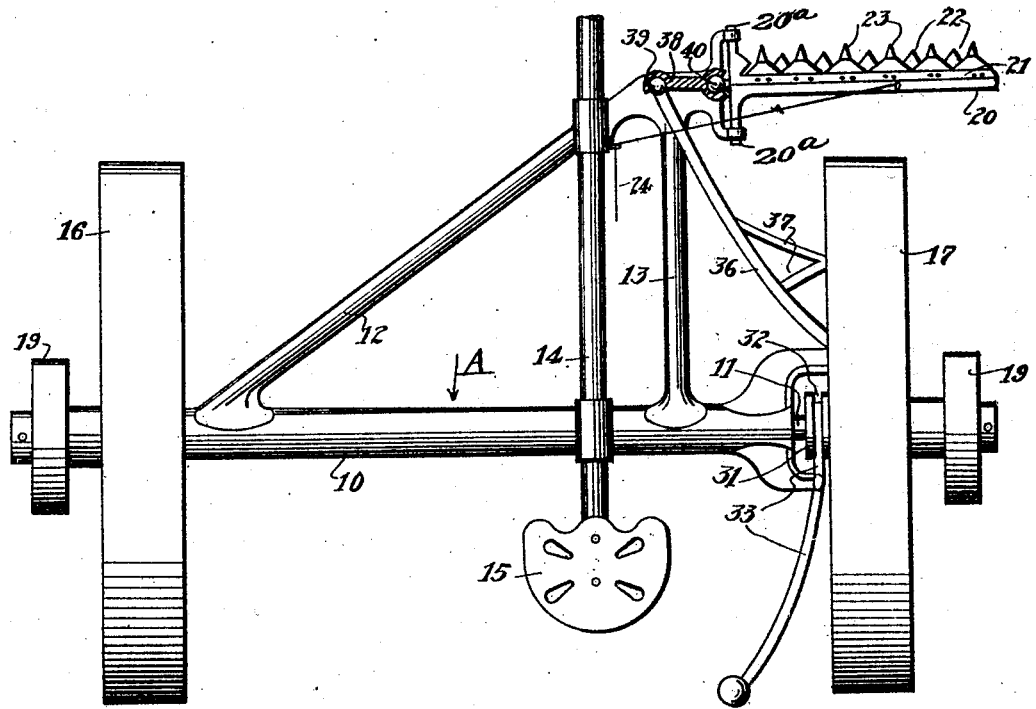
Figure 1 is a plan view of the device.
Figure 3:
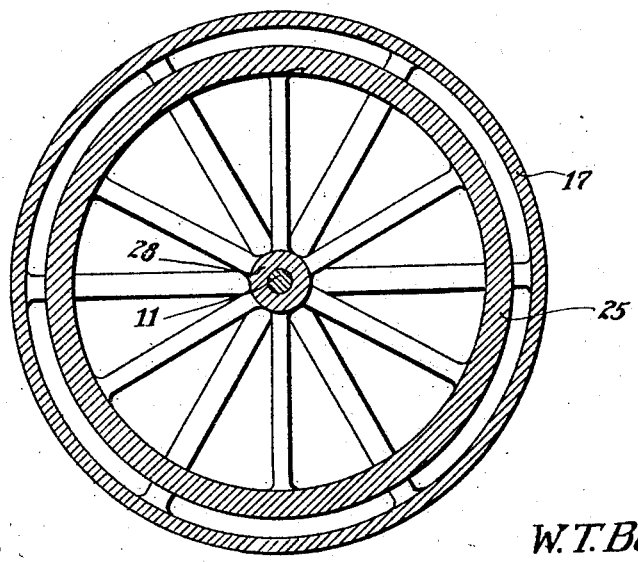
Figure 3 is a cross sectional view looking at the cam.

Referring more particularly to the drawings, the numeral 10 designates the housing within which rotates the axle 11. The housing 10 forms part of a frame A which further includes bars 12 and 13. The numeral 14 designates the draft tongue connected with the frame and 15 designates the driver's seat.

Disposed upon the outer ends of the axle 11 are the wheels 16 and 17 which support the device and these wheels have the usual pawl and ratchet mechanism 18 whereby they will be operatively connected with the axle to drive the same in the ordinary manner. The usual caps 19 are provided upon the ends of the axle outwardly of the wheels. The structure thus far is old and well known.

My invention consists in the provision of a finger bar 20 carried by the frame and carrying a reciprocatory sickle bar 21 having blades 22 of usual shape cooperating with guard fingers 23 carried by the finger bar 20. This finger bar 20 is pivotally mounted on the frame as shown at $20^a$ so that it may be elevated into inoperative position by pulling upon the flexible member 24 connected with the finger bar.

In order that the sickle bar 21 may be driven, I provide a cam 25 carried by the axle adjacent the wheels 17 and having a serpentine cam surface 26 and a retaining flange 27. The rim of the wheel extends over and protects the cam against injury by stones or the like. Also formed upon the wheel 17 is a hub 28 having a clutch face 29 with which cooperates a similar clutch face 30 formed on the sleeve 31 splined upon the axle, and grooved, as shown at 32, for engagement by a forked lever 33 by means of which the sleeve 31 may be shifted to engage or disengage the clutch faces. Pivoted upon the axle housing 10 as shown at $33^a$ is an arm 34 carrying at its extremity a roller 35 engaged with the cam 25, the roller being prevented from disengagement from the cam surface 26 by means of the flange 27.

Carried by the arm 34 is an arm 36, braced as shown at 37, and connected at its outer end with a pitman 38 by the ball coupling 39. The pitman 38 is connected by a ball coupling 40 with the sickle bar 21.

In the operation of the device, when the lever 33 is shifted to engage the clutch faces 29 and 30 and when the flexible member 24 is released to permit the finger bar 20 to swing into horizontal or operative position, and the device is drawn along the ground, the rotation of the cam member 25 will cause the arm 34 to be oscillated rapidly owing to the engagement of the roller carried thereby with the serpentine cam surface 26. The arm 36 will of course be correspondingly moved and this will result in rapid reciprocation of the sickle bar 21 along the finger bar 20 and this movement will of course effect cutting of the grain or grass in the usual manner.

From the foregoing description and a study of the drawings it will be apparent that I have thus provided a simply constructed and yet highly efficient drive mechanism which entirely eliminates the use of the train of gears commonly employed and which is therefore more desirable than the ordinary drive inasmuch as the reduction of the number of parts tends to reduce the danger of derangement to the minimum.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

In a mowing machine including a frame, a supporting axle carried thereby, wheels on the ends of the axle, a finger bar carried by the frame, and a sickle bar movable along the finger bar; drive mechanism for the sickle bar comprising a cam carried adjacent one wheel and having a serpentine face, an arm pivoted upon the frame and carrying a roller engaging said face, means for preventing disassociation of the arm with respect to the cam, a second arm carried by said first named arm and extending at an angle with respect thereto, and a connection between said second named arm and the sickle bar.

In testimony whereof I affix my signature.

WILLIAM T. BLAKE.